May 25, 1943.  F. M. BOWERS  2,320,214
ADJUSTABLE GLASS HOLDER FOR WELDERS' HELMETS
Filed Feb. 19, 1942  2 Sheets-Sheet 1
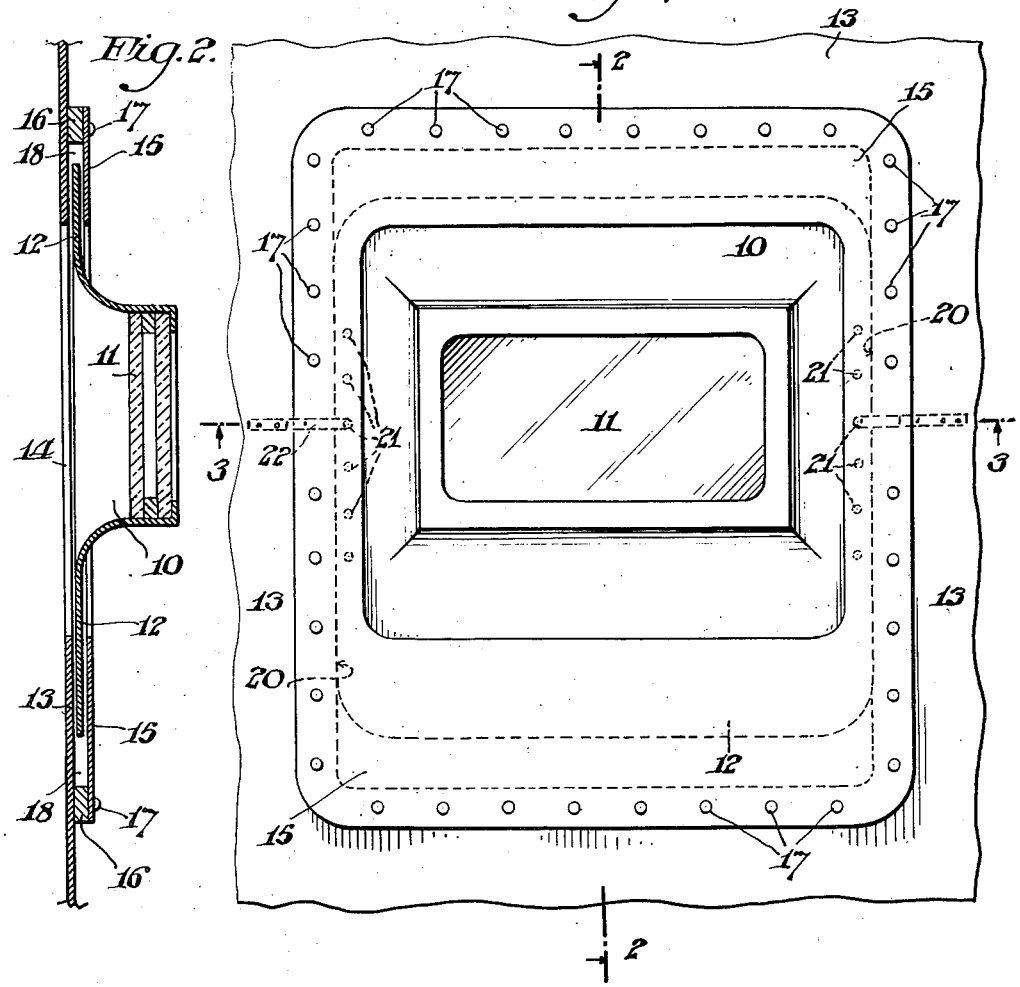
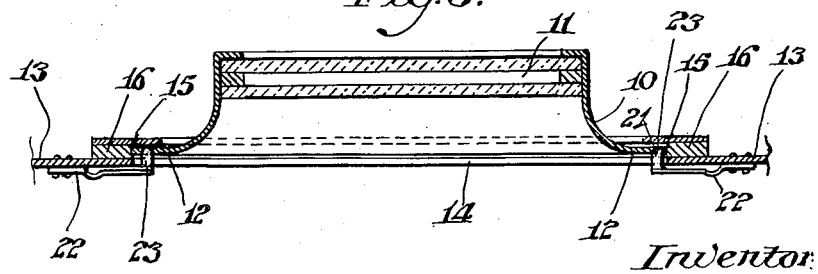
Inventor:
Frederick M. Bowers,
By Barr, Borden & Fox,
Attorney.

May 25, 1943.  F. M. BOWERS  2,320,214

ADJUSTABLE GLASS HOLDER FOR WELDERS' HELMETS

Filed Feb. 19, 1942  2 Sheets-Sheet 2

Inventor:
Frederick M. Bowers,
By Barr, Borden & Fox
Attorney.

Patented May 25, 1943

2,320,214

UNITED STATES PATENT OFFICE 2,320,214

ADJUSTABLE GLASS HOLDER FOR WELDERS' HELMETS

Frederick M. Bowers, Chester, Pa.

Application February 19, 1942, Serial No. 431,692

3 Claims. (Cl. 2—8)

The present invention relates to helmets used in welding operations, and more particularly to an improvement in the holder assembly for the glass through which the work is viewed.

In helmets as heretofore constructed the relation of the holder for the glass to the helmet has been fixed and consequently the field of vision is so restricted that the range in which the work can be viewed in comfort is quite limited. Thus when the operator looks down upon the work the welding can be watched with comparative ease by reason of the assembly which is fixed for that angle of operation. When, however, the welding is overhead this fixed position requires the operator's head to be thrown back in such an abnormal position as to strain the neck muscles and make it very difficult to maintain sustained continuous operation.

Some of the objects of the present invention are to provide an improved helmet and glass holder assembly; to provide such an assembly wherein the position of the glass holder relative to the helmet can be changed at will according to requirements without uncovering the sight opening; to provide means for mounting a glass holder upon a helmet in such a manner that it can be shifted from one position to another while always maintaining the sight opening protected by the glass; to provide a glass holder mounting for a helmet which can be adjusted vertically to vary the line of vision through the sight opening to accord with the most advantageous viewing of the welding operation, and to carry out such adjustment while maintaining protection to the face and eyes of the user; and to provide other improvements as will hereinafter appear. This application is a continuation in part of application Ser. No. 372,525, filed December 31, 1940.

Figure 4:
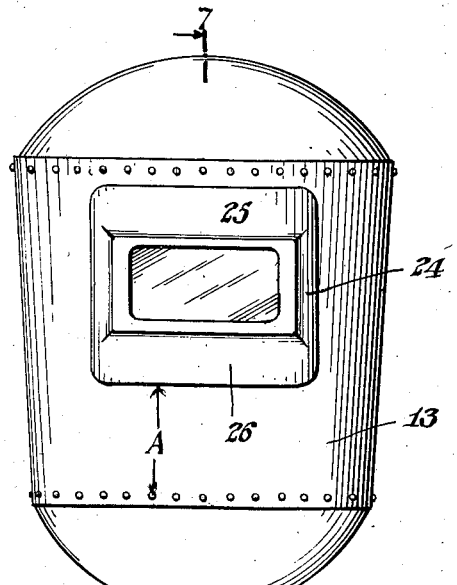
Figure 5:
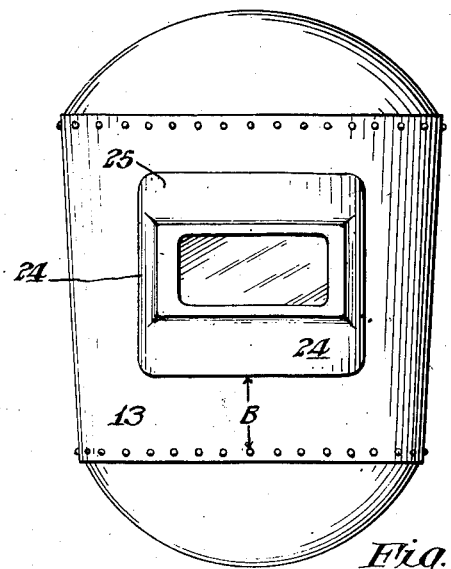
Figure 6:
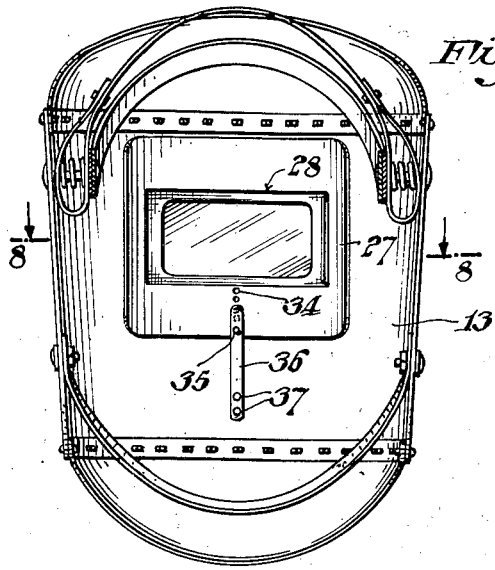
Figure 7:
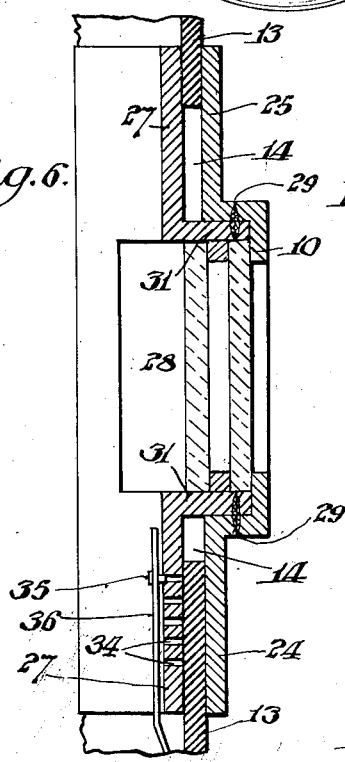
Figure 8:

In the accompanying drawings Fig. 1 represents a fragmentary front elevation of a welder's helmet equipped with an adjustable glass holder embodying one form of the present invention; Fig. 2 represents a section on line 2—2 of Fig. 1; Fig. 3 represents a section on line 3—3 of Fig. 1; Fig. 4 represents a front elevation of a helmet embodying a modified form of the present invention and showing the glass holder in one position with respect to the helmet; Fig. 5 represents a like elevation with the glass holder adjusted to another position with respect to the helmet; Fig. 6 represents a fragmentary rear elevation of the same; Fig. 7 represents a section on line 7—7 of Fig. 4; and Fig. 8 represents a section on line 8—8 of Fig. 6.

Referring to the drawings one form of the present invention consists of a holder 10 for mounting the framed viewing glass 11, such holder being of generally tubular rectangular shape having a rear flange 12 for mounting the holder 10 upon the front face of a welder's helmet 13. This flange 12 is relatively wide and encircles the holder 10 for a purpose now to be described.

In order to mount the holder 10 upon the helmet 13 in alinement with a sight opening 14 provided therein, the flange 12 by reason of its width is seated against the face of the helmet 13 to close the opening 14 except for the window formed by the glass 11. When so located, an annular cover plate 15 is located in registering relation with the sight opening 14, but spaced from the helmet 13 by an annular spacing frame 16, and is fixed in position by rivets 17 or other fastening means traversing the frame 16 and the helmet 13. As shown the vertical dimension of the spacer frame 16 provides upper and lower clearances or ways 18 which permit the holder 10 to have a selected movement either up or down as may be required to adjust the holder 10 vertically with respect to the helmet 13 without uncovering any part of the sight opening 14. The upper and lower extensions of the flange 12 ride respectively in the ways 18 and thus form means to prevent uncovering of the sight opening in all adjusted positions of the glass holder. Thus the glass becomes the only light transmitting means in all adjusted positions of the holder. On the other hand the horizontal dimension of the spacer frame 16 forms vertical guide ways 20 for the holder flange while preventing lateral adjustment of the holder.

For the purpose of anchoring the flange 12 in the selected or adjusted position of the holder 10, the opposite vertical marginal portions of this flange 12 are provided respectively with two series of apertures 21, each series being arranged parallel to the direction of movement of the flange 12. Adjacent each of these series of apertures 21 there is a strip spring 22 fastened to the inner face of the helmet 13 so that its free end projects across the path of movement of the flange 12 where it mounts a holding pin 23 in position to be snapped by the action of the spring when any aperture 21 is brought into register with it. The end contour of this pin 23 is such that pressure of the wall of an aperture against it, under an adjusting movement, will push the pin out of such aperture and permit the desired adjustment.

In the form of the invention shown in Figs. 4 to 8, the holder 10 is preferably formed as an integral part of a rectangular plate 24 which, laterally considered, is of arcuate shape to conform to the contour of the front of the helmet. The dimensions of the plate 24 both vertically and horizontally are substantially greater than the respective width and length of the sight opening 14. Thus the sides of the plate 24 overlap and parallel the vertical boundaries of the sight opening 14, while the top and bottom portions thereof overlap the horizontal boundaries of the sight opening 14. In this connection it should be noted that the top portion 25 of the plate 24, has a vertical length such that in all adjusted positions of the holder 10 the sight opening 14 will remain covered. Likewise the bottom portion 26 of the plate 24 has a vertical length which will prevent uncovering of the sight opening 14 in any adjusted position of the holder 10 relative to the helmet. In other words the holder 10 can be moved either up or down a predetermined distance without admitting light to the eyes of the user, except that which enters through the protecting glass in the holder 10.

In order to provide for this vertical adjustment of the plate 24 and the holder 10, a second rectangular plate 27 is provided on the rear face of the helmet and is properly contoured to fit snugly against this rear face. A rectangular opening 28 is formed in this plate 27 of a size for the proper alinement with the holder 10 and the glass therein. As shown the horizontal boundaries of the opening 28 are formed by two outwardly disposed flanges 31 which pass through the helmet sight opening to seat respectively upon the inner faces of the top and bottom of the frame which forms the glass holder. These flanges 31, are joined to the abutting parts of the holder by spot welding 29 or may be held by any suitable fastening devices. The junction between the two parts is such as to space the front plate 24 from the back plate 27 by a distance slightly greater than the thickness of the material of the helmet 13. The essential relation is such that enough clearance is provided to allow the two connected plates to have free sliding movement relative to the helmet. The vertical boundaries of the opening 28 are respectively in the form of outwardly turned guides 32 in which ride the corresponding edges of the helmet opening. These side faces of the opening 28 form ways for the two clip strips 33 which are fastened along the adjacent respective faces of the holder opening. This strip 33 serves as a retaining means for the glass and its mounting, and permits the two spaced plates 24 and 27 to slide an appreciable distance vertically of the helmet while preventing any horizontal movement relative to the helmet. By so adjusting the glass holder the line of vision of the user can be changed at will to meet different levels at which the welding operation takes place. As shown the dimensions of the plate 27 are substantially the same as for the plate 24, namely, in all vertical positions no light can pass through the sight opening other than that traversing the glass in the holder 10. Thus as shown in Fig. 4, the movable holder assembly is shown in its uppermost position with its lower edge spaced from the row of rivets by a maximum distance A, but no part of the helmet sight opening is exposed. In Fig. 5, the holder assembly is shown in its lowermost position and the distance A has been reduced to B, but no part of the helmet sight opening is exposed. The vertical dimension of the plate 24, therefore allows all vertical adjustments of the holder assembly to be made while ensuring full protection to the eyes and face of the user.

For the purpose of retaining the movable assembly in any selected adjusted position, one part of the plate 27 is provided with a row of holes 34 to selectively receive a pin 35, which is carried by a spring clip 36 anchored at one end to the helmet body as shown at 37. As so mounted the clip 36 overlaps the plate 27 with its pin 35 in alinement with the row of holes 34. These holes 34 are relatively close together in order to allow a sufficient number of working positions for the purpose intended.

In normal use of a helmet thus equipped the holder will be intially adjusted to give the best position for focussing upon the work, which in the majority of cases is below the level of the eyes. When so adjusted it is obvious that the position of the holder, with respect to the eyes of the user, is entirely unsuited for use when the welding takes place above the eye level or even above the head of the user. When such a situation is met the user can quickly shift the holder relative to the helmet and in the direction necessary to bring the work center readily into the field of vision and thus prevent neck strain as well as attempts to perform a welding operation in an awkward and inefficient position.

It will now be apparent that a complete unitary helmet for welder's use has been devised wherein provision is made for easily and quickly changing the position of the glass holder with respect to the helmet so that different working levels can be viewed without the usual discomfort and loss of time.

It is to be understood that while the foregoing description refers specifically to a welder's helmet, this is only by way of example, as broadly the invention comprehends including any shield or mask used as a protection for the face and eyes. Therefore, in interpreting the claims the words "welder's helmet" is to be construed in a broad sense and not as merely applicable to welding operations.

While only two forms are shown in which this invention may be embodied, it is to be understood that the invention is not limited to any specific construction, but might be applied to various forms without departing from the spirit of the invention or the scope of the appended claims.

Having thus described my invention, I claim:

1. In combination, a welder's helmet having a sight opening, a glass holder having a glass for registering relation with said sight opening, a flange attached to said holder, means forming vertical ways for slidingly mounting said flange on said helmet, and means forming horizontal ways for said flange providing top and bottom clearances allowing a predetermined vertical travel of said flange, said flange riding in said clearances in all positions of said holder, whereby said glass is maintained in front of said sight opening at all times.

2. A shield having a sight opening, a glass holder adjustably mounted on said shield and of a size to cover said sight opening in all its adjusted positions, and an eye protective glass in said holder to form the only light transmitting means through said sight opening in all adjusted positions of said holder.

3. A shield having a sight opening, means adjustably movable relative to and continuously closing said opening in all adjusted positions, said means comprising an eye protective glass and an encircling opaque flange closing the sight opening about the glass regardless of the adjusted position of the glass relative to said sight opening.

FREDERICK M. BOWERS.